United States Patent [19]

Lyons et al.

[11] Patent Number: 4,953,162
[45] Date of Patent: Aug. 28, 1990

[54] MULTIPATH LOCAL AREA NETWORK

[76] Inventors: Paul J. Lyons, 425 College Street; Anthony J. McGregor, Massey University, both of Palmerston North, New Zealand

[21] Appl. No.: 89,549

[22] Filed: Aug. 26, 1987

[51] Int. Cl.$^5$ ............................. H04J 3/24; H04J 3/02
[52] U.S. Cl. .................................. 370/94.1; 370/60.1; 370/85.7
[58] Field of Search ....................... 370/60, 94, 85, 86, 370/88, 95, 94.1, 85.1, 85.15, 85.12, 85.13, 95.1, 85.7

[56] References Cited

U.S. PATENT DOCUMENTS

4,380,063  4/1983  Janson et al. .......................... 370/60
4,399,531  8/1983  Grande et al. ......................... 370/94

Primary Examiner—Douglas W. Olms
Assistant Examiner—Wellington Chin
Attorney, Agent, or Firm—Nixon & Vanderhye

[57] ABSTRACT

A local area network which is multi-path in nature and uses many small programmed nodes interconnected by low bandwidth cables with a typical data transfer rate of 9600 BPS. Connections between pairs of devices on the network are obtained by a flooding technique at the start of communications which is performed by a network control program resident in each node. Data transmitted between devices connected to the network is packetized and routed through the network via the nodes identified by the flooding operation. Packet transmission through node output ports is buffered and multiplexed so as to reduce degradation in response time by heavy traffic monopolizing a node output port.

27 Claims, 10 Drawing Sheets

MULTIPATH LOCAL AREA NETWORK

FIELD OF THE INVENTION

The present invention relates to local area networks. In particular it enables the setting up of pairwise data communications connections amongst an arbitrary number of external devices which employ the EI RS232C data communications standard. These may take the form of processor units, terminals, and printers, for example.

PRIOR ART

Local networking of computer devices usually takes the form of a "star" topology involving a central mainframe or a proprietary local area network ("LAN") which interconnects all the computing resources via a single high-speed link in a ring configuration or a multi-drop configuration.

There are several disadvantages with these conventional networks. In star networks, all communications are dependent on the central device. If this should fail, all communications cease completely. A second disadvantage with the star network is implicit in its topology. It is a technique for connecting many small devices to only one large device. If in fact there are not one, but several, large devices with which any workstation must be able to communicate, then the large devices must themselves be linked to form a single logical device, and such linkages often prove to be a communications bottleneck. The reason for this is not that the raw speed of the link is insufficient, but that the large devices are too busy performing ordinary data-processing tasks to provide an adequate message-transfer service.

The topology of the star network also creates another disadvantage. Every device in the network must be connected to the central processor by a separate cable. Addition of new devices to the network requires cabling to be installed back to the central processor, which is expensive in terms of labour and disruption to existing services as well as cable costs.

LANs are normally dependent on a single high-speed link. This introduces two disadvantages. The first is that although outlying workstations may only require low-speed communications, a high-speed connection or an expensive converter for a low speed connection must still be installed. Thus it can be very expensive to install a LAN in, for example, any environment spread over a number of buildings.

The second disadvantage with the single high-speed cable is that it is essentially a central resource, and everything else depends on its reliability. Failure of the cable deprives all users of the communications facility.

A technique not normally used for local networking is packet switching. This is a technique used in wide area networks for data transferral. It enables pairs of devices attached to a multi-path communications network to transmit data over the network without specifying the route to be used. This is the network's responsibility.

Because the network is multi-path, high bandwidths may be achieved in heavy-use regions by the use of multiple cables, but low-use regions may be attached to the network by single, low-cost cables. The multi-path topology also permits the implementation of load levelling techniques to make best use of the effective available bandwidth.

However, wide area networks (WANs) using the packet switching technique have in the past only been applied by large organisations on a national or international scale. Relatively few, but comparatively powerful, nodes are used. Each such node is attached to a large number of devices through some subsidiary data communications system akin to a local network. In the local environment this is disadvantageous as a large number of small nodes form a more appropriate topology than a small number of large nodes. Furthermore these WANs do not allow for minimal operator intervention and frequent variation of network topology.

SUMMARY OF THE INVENTION

It is an object of the invention to provide a local area network which is multi-path in nature and uses many small intelligent nodes. Connections between pairs of devices on the network are obtained by a flooding technique at the start of communications which is performed by a network control program resident in each node. Data transmitted between devices connected to the network is packetised and routed through the network via the nodes identified by the flooding operation. Packet transmission through node output ports is buffered and multiplexed so as to reduce degradation in response time by heavy traffic monopolizing a node output port.

DETAILED DESCRIPTION OF THE PREFERRED EMBODIMENT OF THE INVENTION

The network of the present invention essentially comprises a number of intelligent four-port nodes connected together by low bandwidth cables. Computer devices connected to the network through node ports which are not connected to other nodes. Computer devices such as central processing units may have more than one I/O port connected to the network. The network is structured such that one device has the capacity of connecting to many devices and visa-versa. Connections between pairs of devices is established by a "flooding" technique and communication between devices is conducted by a packet switching technique.

Flooding is a process which allows two devices attached to the network to establish a data communications connection on request, irrespective of the location of either device, provided that there is at least one I/O port on the requested device which is unconnected at the time of the request. The only "map" information used when a route for such a connection is being found is the list kept by each node of the names of any external devices attached to its I/O ports. The network does not store a map of either its overall topology or of the external devices attached to its nodes.

A disadvantage of flooding is its high overhead. The present invention reduces the overhead by only flooding once per connection, in order to establish the route for that connection.

Figure 1:
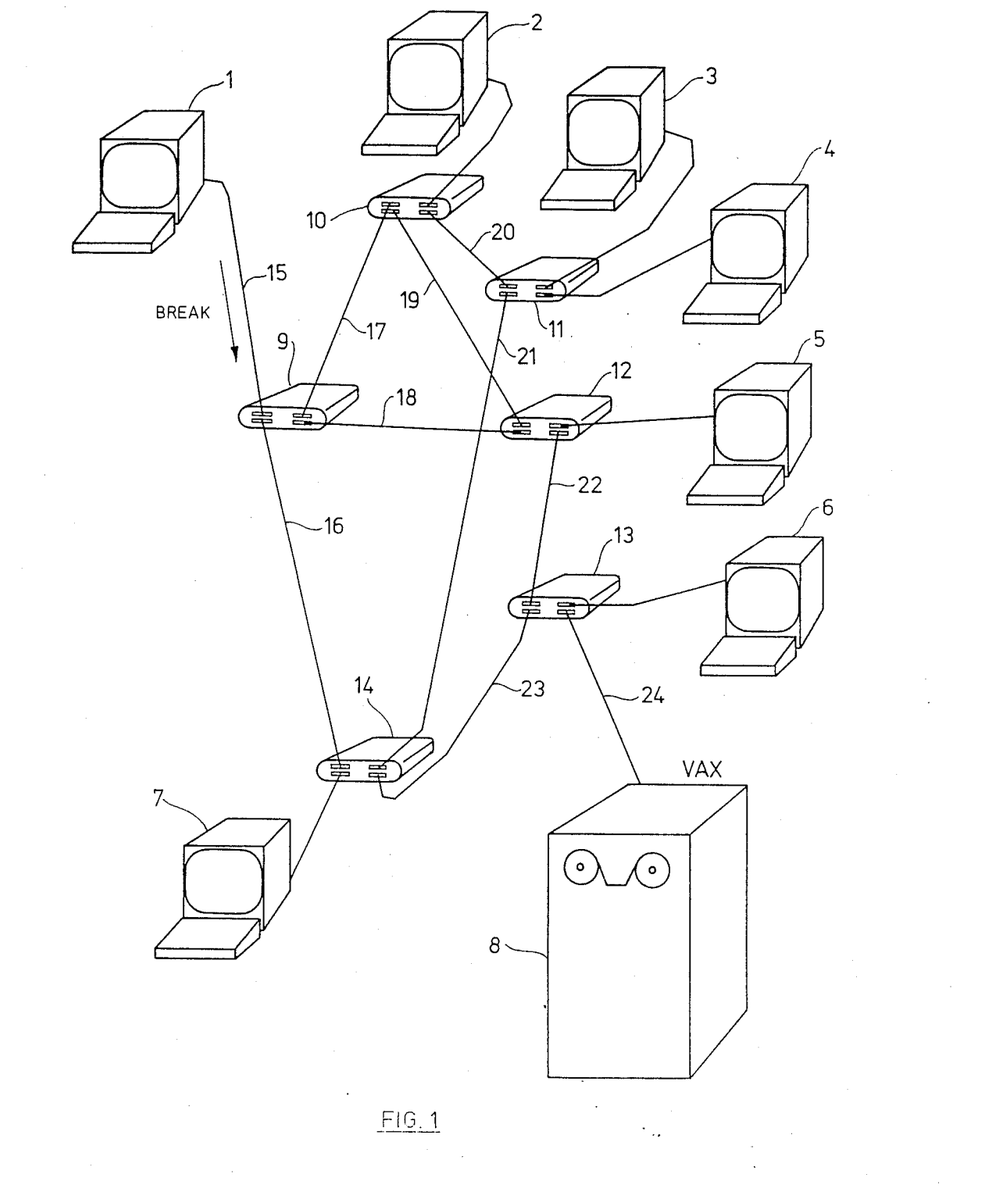
FIG. 1 shows a simple network according to the present invention having connected to it seven terminal devices and one computer device.
Figure 2:
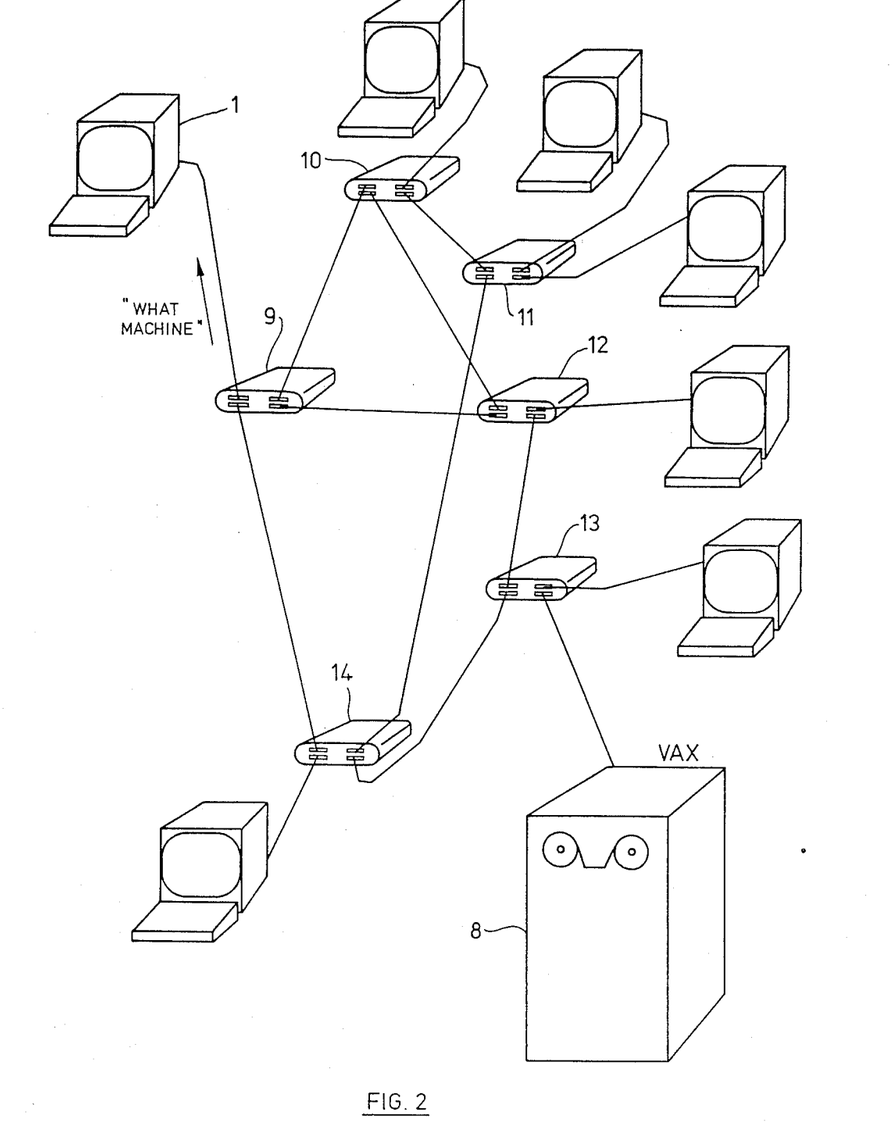
FIGS. 2 to 7 show the FIG. 1 network in various states during flooding.
Figure 3:
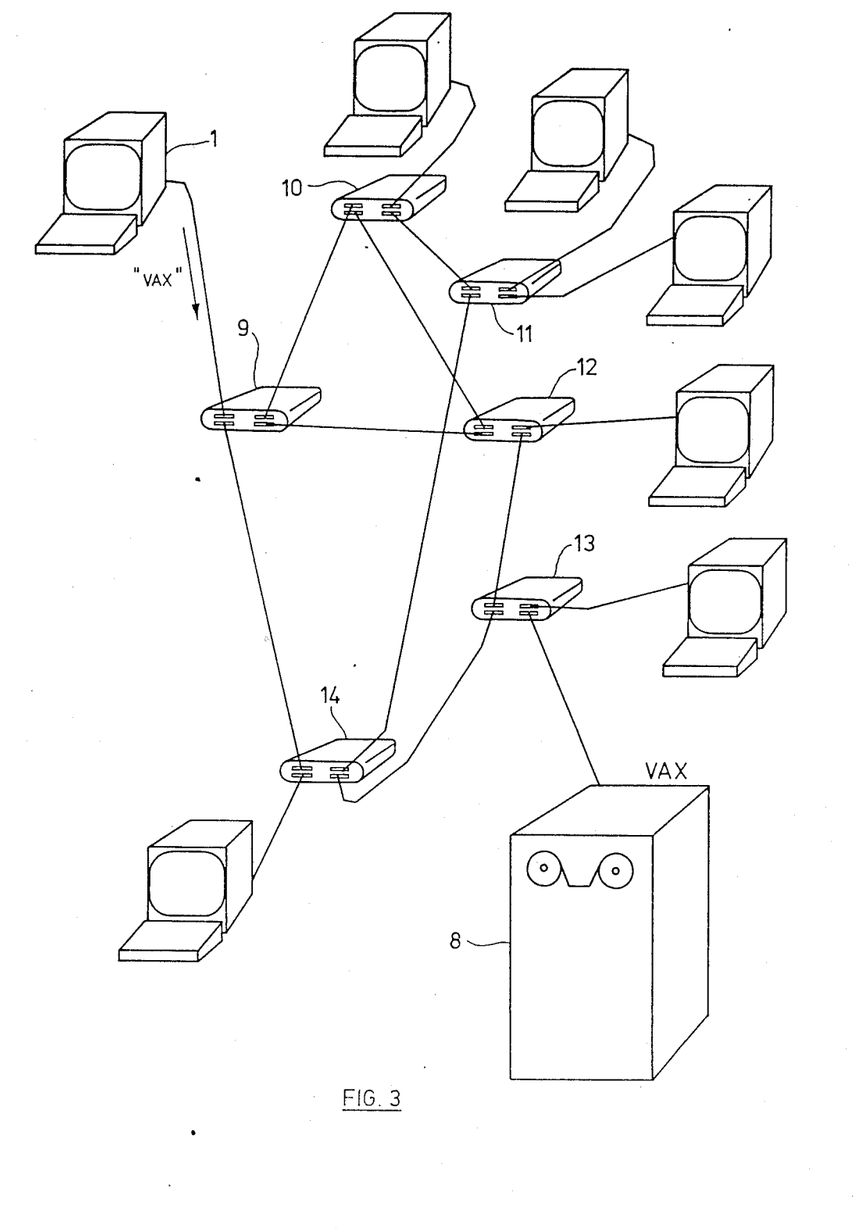
Figure 4:
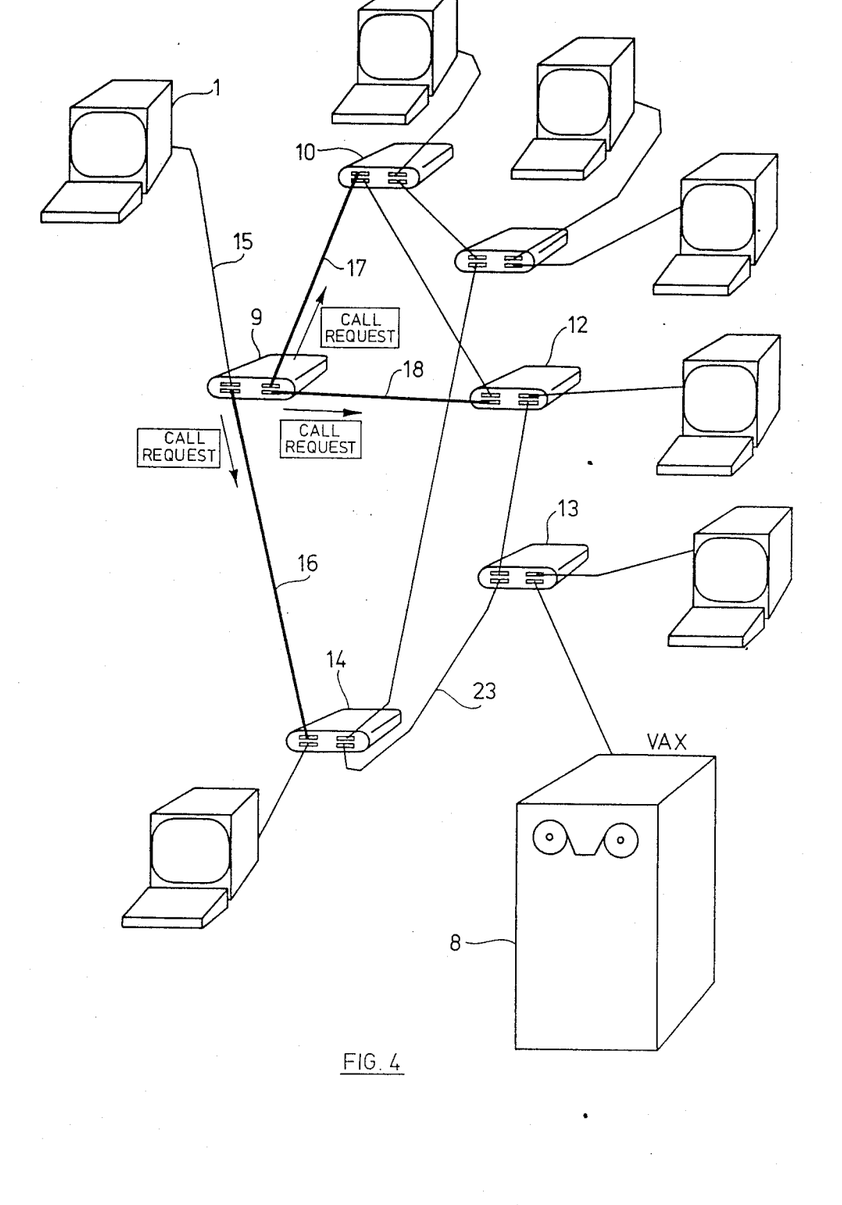

An example of how the present invention establishes a connection by flooding will be given with reference to FIGS. 1 to 6. In this example, terminal device 1 requests the network for a connection to computer device 8 (FIGS. 1 to 3). When node 9 receives a request from device 1 for a connection to another device, it may react in two ways. If the requested device is attached to one of its own I/O ports, it provides a connection without involving any other network nodes. If not, as is the case in this example, it sends a message to any network nodes to which it is attached, namely nodes 10, 12 and 14, requesting a connection between the requesting device 1 and the requested device 8 (FIG. 4).

Figure 5:
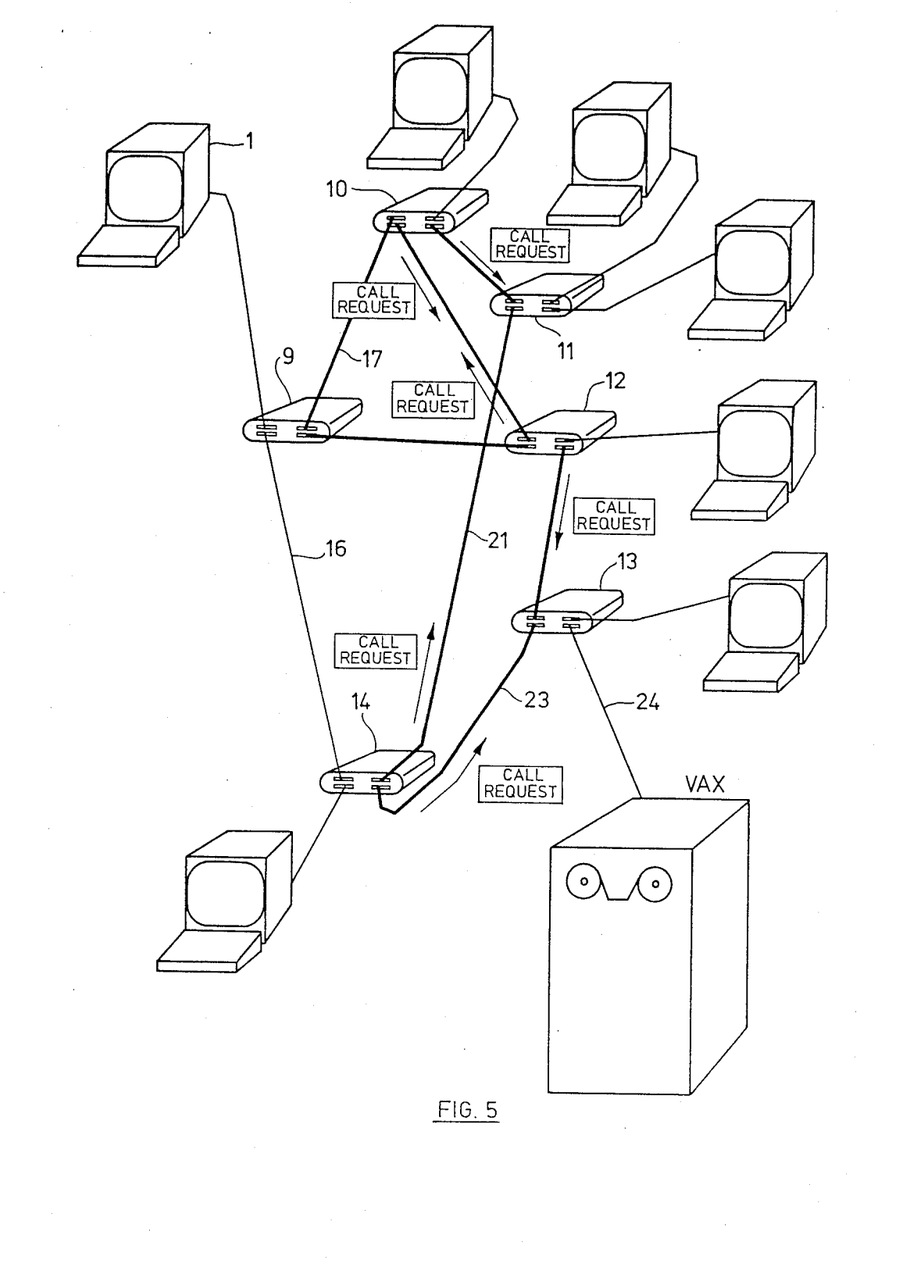
Figure 6:
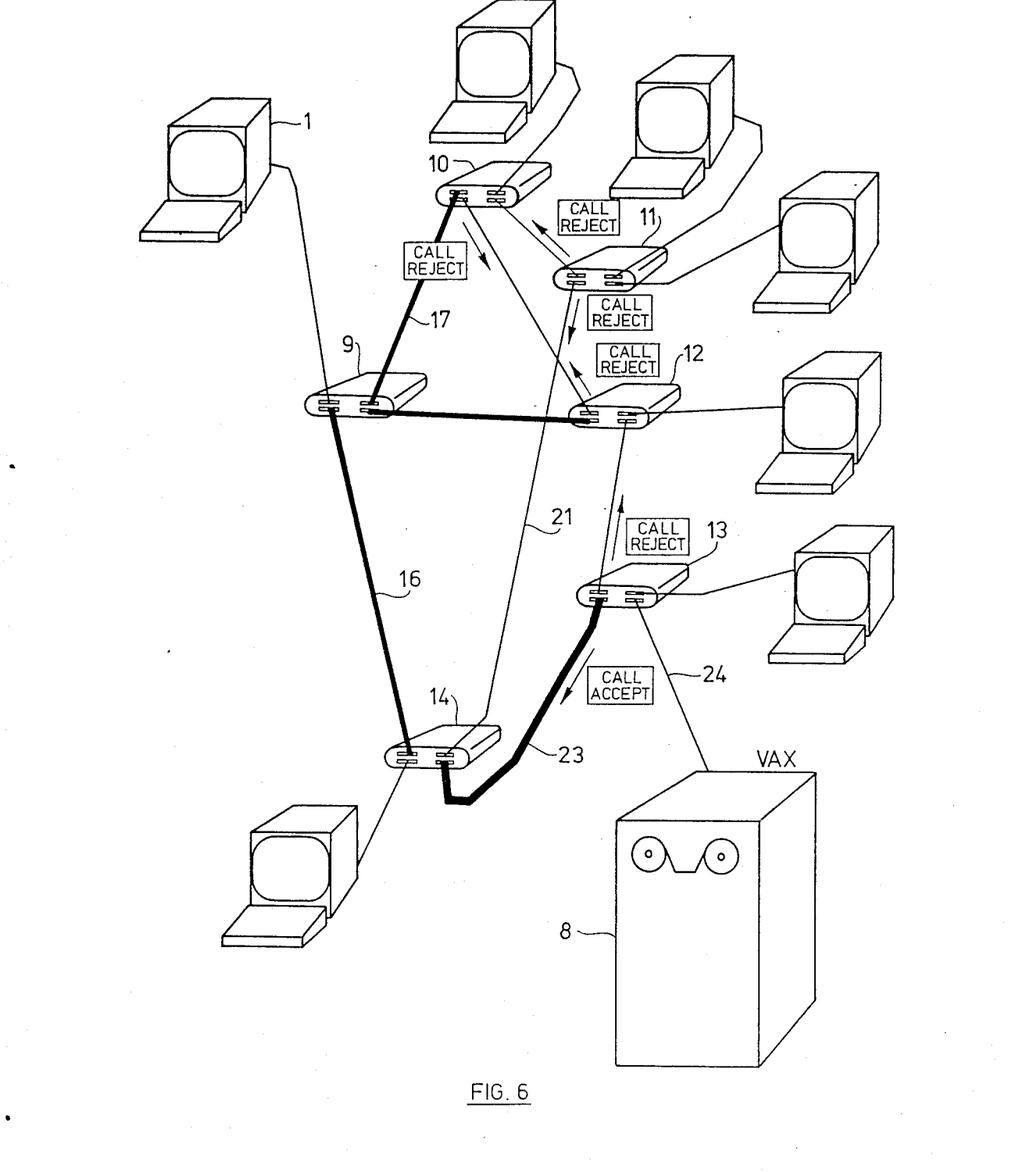
Figure 7:
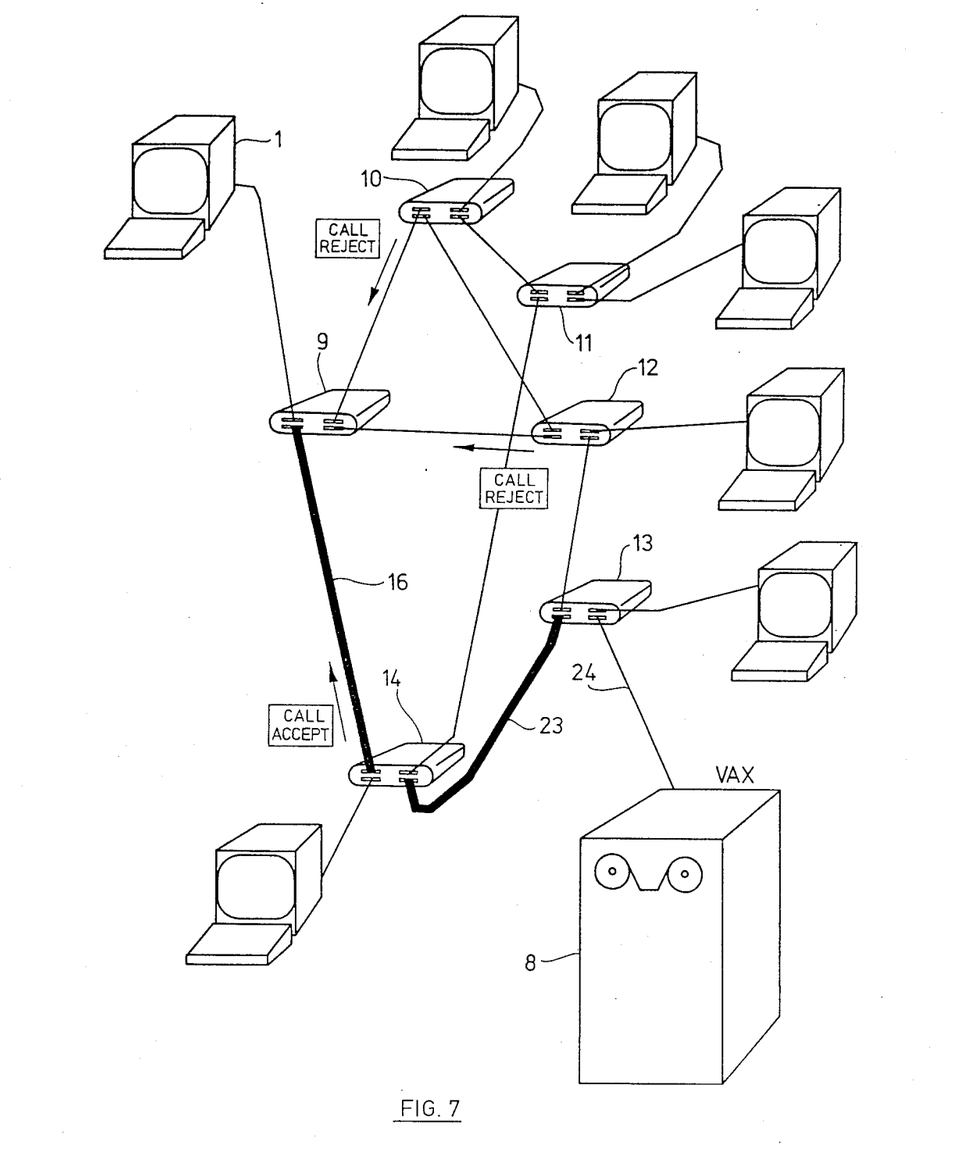

As nodes 10, 12, 14 are not attached to device 8, but have I/O port(s) connected to the network through which the current "flood" has not been received, they pass the flood out through these port(s) to the adjacent node(s) 11 and 12; 10 and 13; 11 and 13 respectively (FIG. 5).

If a node is a "dead end," (i.e., it is neither attached to the requested device nor able to pass the flood on to another node from which it has not already received the flood), it rejects the flood by sending a "not found" Call Reject message to the node from which it received the flood.

If note 13 which is attached to the requested device 8 has one or more I/O ports currently free of a network connection, it replies to the flood by establishing a network connection between I/O port 24 connected to the requested device 8 and I/O port 23 connected to the node from which the request was received, and it sends a Call Accept message out I/O port 23. If there was no I/O port attached to requested device 8 free of a network connection, node 13 would reject the attempt to connect, by sending a "busy signal" Call Reject message to node 14.

Nodes which have passed on a flood must eventually receive messages in reply to all floods passed on, selected from the types Call Accept ("difficulty"), Call Reject ("busy signal"), and Call Reject ("not found").

If only one flood was passed on: a Call Accept reply is passed on with its "difficulty" increased to take into account the loading at the current node; a Call Reject of whatever variety is passed on unaltered.

If more than one flood was passed on, the node must wait until it receives replies to all passed on floods before it passes its own reply on. When it has received all replies, it selects the most appropriate one to pass on: If it has received more that one Call Accept, it selects the one with the lowest difficulty (or if two Call Accept replies have the same difficulty, the one arbitrarily) increases the difficulty to account for its own loading, and passes it on; if it has received only one Call Accept, it increases the difficulty to account for its own loading and passes it on irrespective of the nature of the other replies; if it has received only Call Reject messages then if at least one was a Call Reject ("busy signal"), it passes on a Call Reject ("busy signal"); otherwise, it passes on a Call Reject "not found".

Eventually (see FIG. 6), reply messages must appear at each of the internal network I/O ports on the node 9 to which the requesting device is attached. As one of these replies is a Call Accept, the node 9 confirms a connection with the node from which the Call Accept was received (node 14). If there were no Call Accepts the node abandons the attempt to connect.

After a connection is made information is transferred on the present network by a form of packet switching. This is an adaptation of a technique used in wide-area networks, but has been optimised for local area use. Packet-switching allows the use of multiple transmission paths in a local area network. The information transferred by packet-switching may be either data or network control information.

When data characters are received through a node I/O port attached to an external device, they are "packetised" by the node. This involves making them up into standard-sized groups of data characters, each group preceded by a header and followed by a termination character. When a group of data characters has been packetised, the packet is sent out an I/O port connected to the first node on the path determined by the flood. That node reads the routing information contained in the packet's header and forwards the packet to the next node on the path determined by the flood. While the currently processing node is determining the appropriate direction to send the packet, the data in the packet and the routing information are stored in the node's memory.

Characters of data received from an external device for packetising, which are separated by more than a minimum ("time-out") delay, are packetised without waiting for enough characters to completely fill the packet's data field. In this way, rapid character echo from the device at the other end of the network connection is achieved.

Only the data characters received before the time-out occurs are transmitted through the network in the packet (i.e. the data field is not filled out to its maximum size with null data). Thus short messages do not result in the transmission of large amounts of null information through the network, and the data transmission capacity of the network is not used inefficiently, even when many short messages are being transmitted.

The network nodes employ a two-phase buffering scheme to store packets (a) between the times when they arrive at the node through an input port and are processed, and (b) between the times when they are processed and when they are routed out another port. This allows sufficient time for the processor in the node to determine the destination of the packets, and to time-multiplex the internode links in such a way as to prevent heavy-traffic connections from degrading the service obtained by interactive users whose connection shares one or more physical links with them.

The input buffering mechanism provides a holding area for packets until the node precessor is free to deal with them. A FIFO queue is associated with each port. When a packet arrives through a port, it is added to the tail of the appropriate queue. The processor deals with the queues cyclically, removing a single packet from the head of the queue, processing it, and then moving to the next queue.

Output buffering is used to prevent heavy data traffic on a line from degrading low-volume interactive communications to an unacceptable level. The action of the output buffer is shown diagrammatically in FIG. 8. Each output port has associated with it a circular list 31 of queues 32a to 32f of packets a1 to f2 waiting for transmission out through the port. Each of the queues contains packets belonging to only one of the network virtual connections using the port. The node's output routine works around the circular list, removing a single packet a1 from the current virtual connection's queue 32a for transmission and then moving one position round the list to the next virtual circuit's queue 32b for the next packet b1. In this way, packets from low-use virtual circuits do not have to wait for service at the tail of a long queue of packets belonging to a heavy-traffic virtual circuit. When a virtual circuit's queue becomes empty, its entry in the circular list is deleted. Thus time is not wasted examining list entries belonging to virtual circuits which are not in use.

In a network configuration in which connection to a single attached device may from time-to-time be requested by more other devices than it has I/O ports connected to the network, that device can be regarded as a scarce resource. The present network allows such scarce resources to be time-shared between requesting devices. Flooding enables an otherwise unused I/O port on the scarce resource to be found and a virtual circuit to be established between it and the requesting device, irrespective of the nature or location of the requesting device.

Any number of I/O ports on a given external device may be assigned the same name, and any request for a device with that name will result in the assignation of a connection to one of these I/O ports, if at least one is unconnected at the time of the request.

Figure 9:
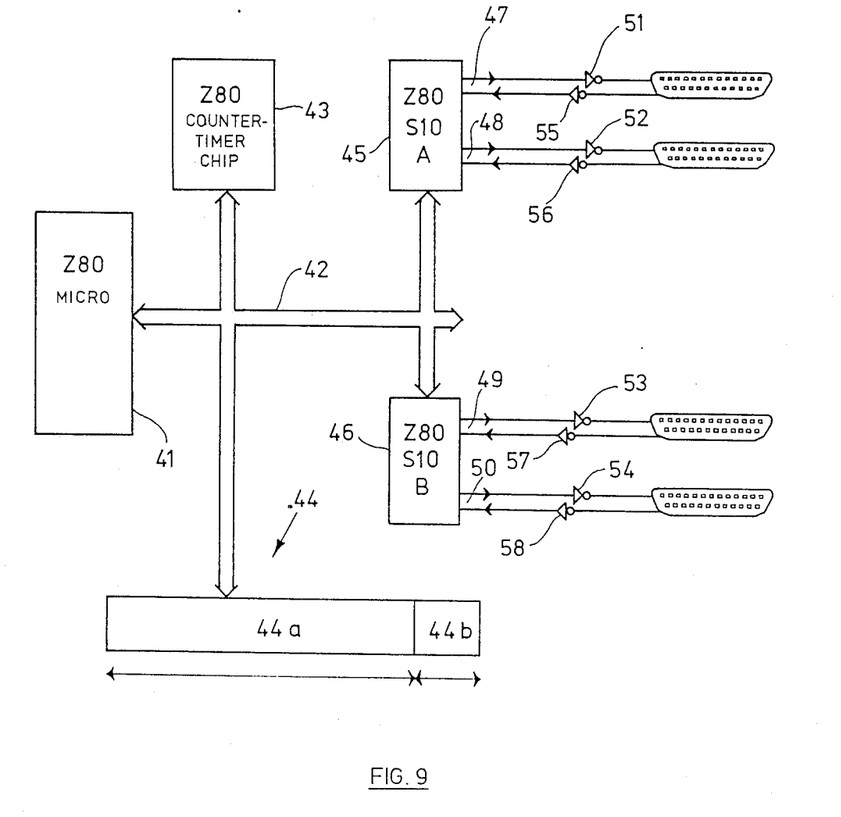
FIG. 9 is a block diagram of a node according to the present invention.

Referring to FIG. 9 each node includes Z80-microprocessor 41. Connected to the processor bus 42 are a counter timer 43, memory 44, and serial input-output controllers 45 and 46, RS232C drivers 51, 52, 53, 54 and RS232C receivers 55, 56, 57, 58 Memory 44 includes a 60K byte RAM 44a and a 4K byte ROM 44b. Each I/O controller 45 and 46 services two RS232C I/O ports 47-50. The network control program is stored in RAM 44a. The controllers 45 and 46 support a transmission speed of 9600 BPS.

Figure 8:
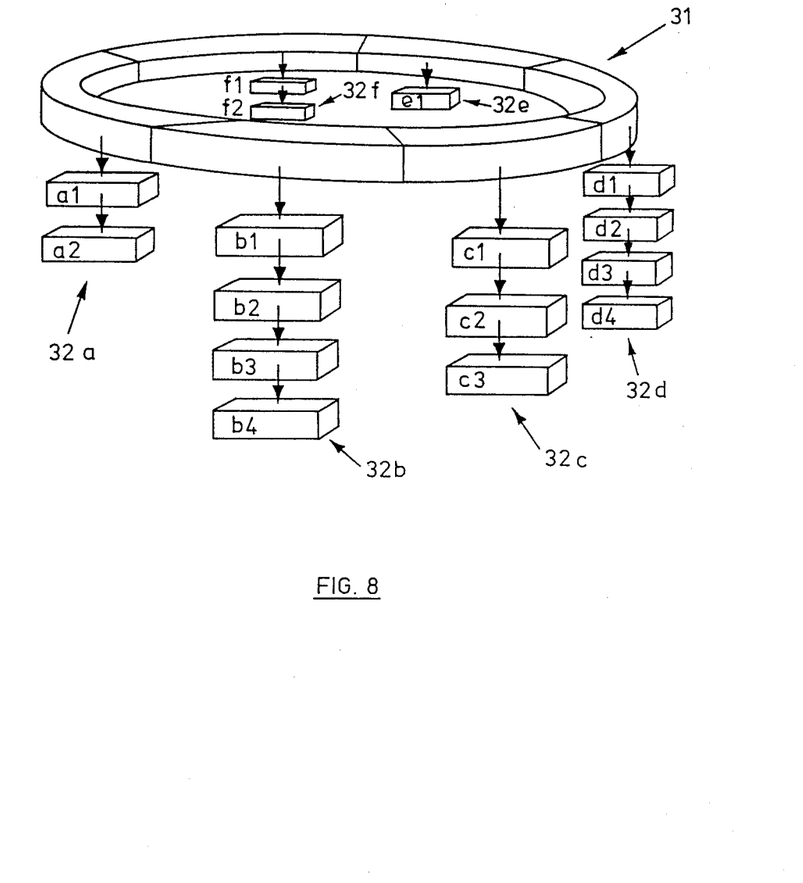
FIG. 8 diagrammatically shows the queuing technique used for buffering network node output ports.

A network can be built from a single node as shown in FIG. 8 with from four external connections (to share a single processor, or printer, for example) up to any size. Both internodal and external connections are made with standard 2-wire-plus-shield, low-cost, cabling.

The network above described in topologically highly flexible in four respects: internal/external flexibility; expansion/contraction flexibility; damage-control flexibility and attachment/detachment flexibility.

The I/O ports on the network nodes may be used with equal ease for both internal connections and external connections. The data communications protocol of the I/O ports does not impose any restrictions on the topology of the network. Any or all of the I/O ports on a node may be programmed to use either the RS232C character-based message level data communications protocol for communication with external devices or the network's own internal packet-based message level data communications protocol.

The network may be contracted merely by the removal of nodes. It may be expanded merely by the attachment of a node to an I/O port of a node in an extant network. The newly added node does not need any preprogramming. Neither expansion nor contraction of the network requires that the network control program be stopped.

When a network node receives input which may only come from an external device through an I/O port which was previously used for internode communication, it reconfigures that port as an external port. Such input is generated at the start of any communication between an external device and the network via the standard network interface. Hence the replacement of a network node by an external device, results in automatic contraction of the network the first time that external device initiates any communication with the network.

Conversely, a node newly connected to an external port on an extant network initiates an interchange of messages with the extant network which results in the reconfiguration of the network's I/O port from the external to internal, and loading of the network control program from the extant network into the newly attached node. The newly attached node is then capable of functioning as a part of the overall network.

Figure 10:
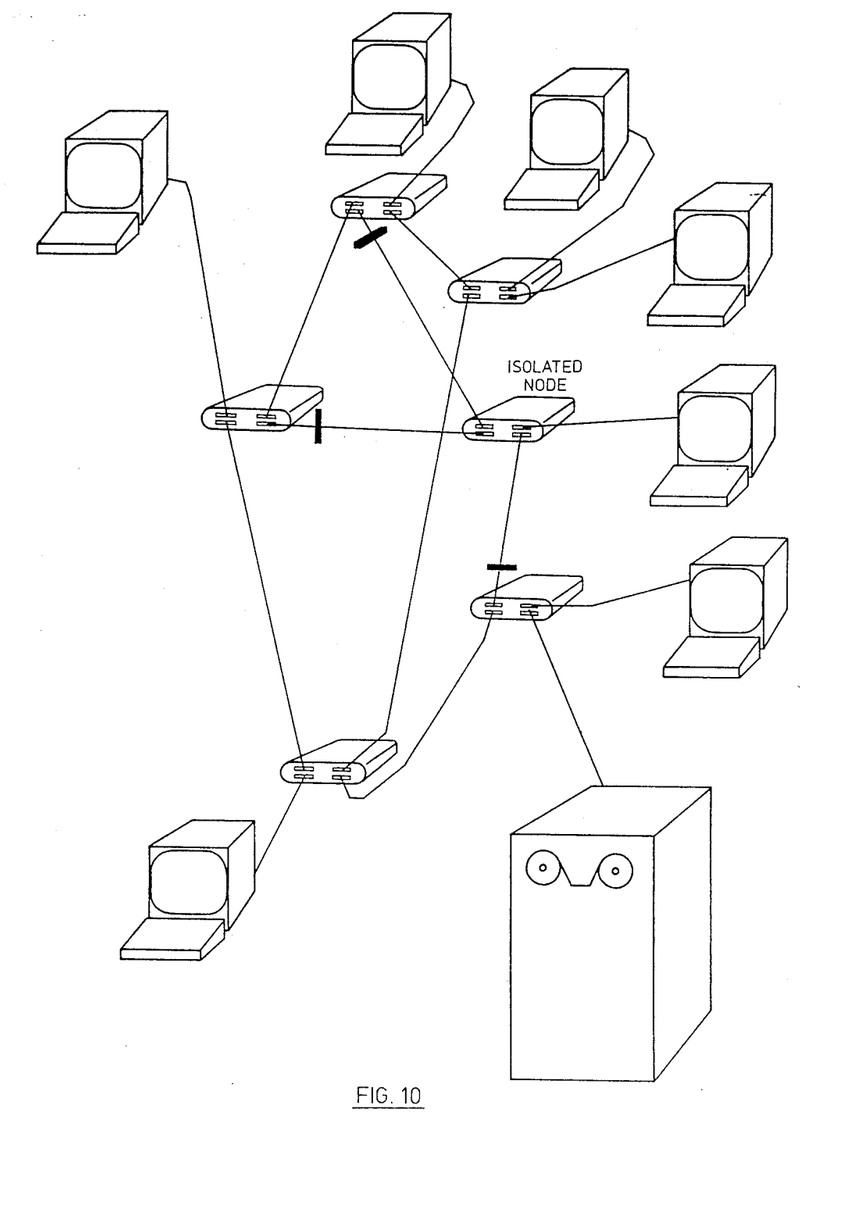
FIG. 10 shows the FIG. 1 network in a state where one node has been isolated as a result of malfunction of that node.

Nodes and internode cables may become disconnected from the rest of the network, or cease functioning, without altering the network's ability to function (except insofar as the node(s) or cable(s) concerned form(s) the only possible route for particular communication paths). The nodes are programmed to check their interconnecting links continually, and will disable any internode links which are found to be faulty. Later detection of correct operation will cause the affected link(s) to be re-enabled. FIG. 10 shows a node which has been isolated after ceasing to function correctly.

The node control program is stored in dynamic RAM in each mode. In order to allow the network to be immune to catastrophic events such as a power failure, and also to allow nodes to be added to or removed from the network with minimal disruption to its operation the network includes an automatic loading sequence. When a node is first powered up or reset, it sends a request out through one of its ports to connect to a pre-loaded address. If this message does not elicit a reply (because the port is not connected to another network node) the node tries other ports in succession until a reply is received. The request is not in packet form, but in plain text such as would be received from a terminal. The node which receives the request recognises the address as a request for the node control program and downloads a copy to the requesting node.

When the program has been received and starts to run it first sends a message through all its ports instructing the neighbouring nodes to reconfigure the ports to which it is connected as internodal ports. These nodes send an acknowledgement of the message, and the newly added node then has enough information to correctly configure its own ports as internodal or external. Normal network operation is then possible.

In the event of a power failure which affects the whole network, there is no source of control program in the nodes. This problem is overcome by the provision of a non-erasable read only memory attached to the network. This contains the network control program independently of power fluctuations and responds to a request for this program in the same way as would a node containing this program. This makes network independent of any mainframe which could be used as a source of the network control program and it also provides an easy way of introducing new releases of the network control program into the network. It forces a new program to tunnel its way into the network and take up residence in all the nodes.

We claim:
1. A multi-path local area network system for interconnecting asynchronous communicating computer devices which may have one or more input-output ports connected to the network, said system comprising:

a plurality of intelligent nodes, each node having at least four input-output ports, low bandwidth physical connections between nodes, each node being physically connected to at least one other node, with unused node input-output ports being available for low bandwidth connection to said computer devices;

each said node including:

a microprocessor with bus connected memory, said at least four serial input-output ports being connected to said microprocessor, and a network management program loaded in said memory;

said program controlling the action of the nodes such that when a first one of said nodes receives a request for a virtual network connection to a second one of said computer devices from a first one of said computer devices to which the first node is physically connected (i) the first node transmits said request to all of the said nodes physically connected to it, (ii) each of said nodes receiving said request from another of said nodes ascertains whether the second device is connected to it and if not transmits said request to all of the said nodes physically connected to it, (iii) when said request reaches a last one of said nodes which last node is connected to at least one of said input-output ports of the second computer device, a call accept message is transmitted by the last node to the node or nodes from which it received the said request, (iv) when one or more of said call accept messages are received by the first node, the first node confirms a virtual network connection with the last node and enables communication between the first and second computer devices;

(v) the first and last nodes packetise character data which is transmitted between the first and second computer devices once the virtual network connection has been made such that each packet of the character data contains a header containing network routing information identifying nodes in the virtual connection as well as a block of said character data, and (vi) said packets are transmitted through the virtual network connection between the first and second computer devices via said nodes identified in the packet header.

2. Apparatus as in claim 1 wherein the action of said nodes is controlled such that when, in response to a received request for connection message, a node ascertains that any of its input-output ports not in use and connected to other nodes are not free connections to the requested device, and it ascertains that any of its input-output ports through which it transmitted said request for connection message have received a message rejecting such request, the node transmits a call reject message through its input-output port connected to the node or nodes from which it received the request for connection message.

3. A multi-path local area networking method for interconnecting asynchronous communicating computer devices which each may have one or more input-output ports available for connection to the network, said method comprising:

linking together a plurality of intelligent nodes, each having at least four input-output ports, by low bandwidth physical connections so that each said node is physically connected to at least one other said node, with unused ones of said node input-output ports being made available for low bandwidth connection to said computer devices; and controlling the action of the nodes such that when a first node receives a request from a computer device connected to it for a connection to another computer device, (i) the first node transmits the said request for connection to all other nodes connected to it, (ii) each node receiving the said request for connection from said first node ascertains whether the requested device is connected to it and if not transmits the said request onward to all nodes connected to it, (iii) when the said request for connection reaches a second node which has one or more unused input-output ports of the requested computer device connected to it a call accept message is transmitted by the said second node to the other of said node or nodes from which it received the said request for connection, (iv) when one or more of said call accept messages are received by the said first node, the first node confirms a connection with the second node and enables communication between the two computer devices connected to the first and second nodes;

(v) the first and second nodes packetise ensuing character data transmitted from each said computer device thus connected to the first and second nodes such that each packet contains a header containing network routing information as well as a block of data, and (vi) said packets are transmitted through the network to the connected device via the nodes identified in the packet header.

4. Method as in claim 3 wherein the action of said nodes is controlled such that when, in response to a received request for connection message, a node ascertains that any of its input-output ports not in use and connected to other nodes are not free connections to the requested device, and it ascertains that any of its input-output ports through which it transmitted said request for connection message have received a message rejecting such request, the node transmits a call reject message through its input-output port connected to the node or nodes from which it received the request for connection message.

5. A programmed node for use in a multi-path local area network system for interconnecting asynchronous communicating computer devices which can have one or more input-output ports connected to the network, said node comprising:

a microprocessor with bus connected memory and at least four serial input-output ports for connection to at least two other nodes and to said computer devices, and a network management program loaded in said memory, said program controlling the action of the said node and said other nodes such that:

(i) when said node receives a connection request from a computer device connected to it for connection to another computer device, the said node transmits the request for connection through those input-output ports which, in use, have said other nodes connected to them, (ii) when said node receives a connection request through an input-output port which, in use, is connected to one of said other nodes ascertains whether the requested device is connected to one of the input-output ports of said node and, if not, it transmits the connectin request through input-output ports which in use have said other nodes connected to them and through which a request for a connection to the said computer device has not been received, (iii) when in response to a received request said node affirms that a requested device is connected to it with a currently unused input-output port, it transmits a call accept message through its input-output port connected to the node or nodes from which it received the said connect request, (iv) when one or more of said call accept messages are received through the input-output ports of said node it confirms a connection with the one of said other nodes originating the call accept message and signals to the requesting computer device connected to it that communication may now commence;

(v) character data received from connected computer devices is packetised such that each packet contains a header containing network routing information as well as a block of data, and (vi) that packet is transmitted through the input-output connected to the said node from which it received the call accept message.

6. Apparatus as in claim 5 wherein the action of said nodes is controlled such that when, in response to a received request for connection message, a node ascertains that any of its input-output ports not in use and connected to other nodes are not free connections to the requested device, and it ascertains that any of its input-output ports through which it transmitted said request for connection message have received a message rejecting such request, the node transmits a call reject message through its input-output port connected to the node or nodes from which it received the for connection message.

7. A multi-path local area network system for interconnecting asynchronous communicating computer devices which may have one or more input-output ports connected to the network comprising:

a plurality of intelligent nodes, each node having at least four input-output ports, low bandwidth physical connections between nodes, each node being physically connected to at least one other node, with unused node input-output ports being available for low bandwidth connection to said computer devices;

each said node including:
a microprocessor with associated memory,
said at least four serial input-output ports being connected to said microprocessor,
and a network management program means loaded in said memory;
said program means controlling the action of the nodes such that:

when a first one of said nodes received a request for a virtual network connection to a second one of said computer devices from a first one of said computer devices to which the first node is physically connected, a virtual network connection is established through said first node between the first and second computer devices of the first node is physically connected to at least one of the input-output ports of the second computer device which input-output port is unused, otherwise if the first node is not physically connected to a said unused input-output port of the second computer device;

(i) the first node transmits said request to all of the said nodes physically connected to it, (ii) each of said nodes receiving said request from another of said nodes ascertains whether the second device is connected to it and if not transmits the said request to all of the said nodes physically connected to it except for the one or more nodes from which it received said request, (iii) when said request reaches a last one of said nodes which last node is connected to at least one said unused input-output port of the second computer device, a virtual circuit connection is established between the last node and the second computer device and a call accept message is transmitted by the last node to the node from which it received the request, (iv) when said request reaches one of said nodes, being a dead-end node, which dead-end node is not physically connected to a said unused input-output port of said second computer device and is not able to transmit said request as defined in (ii) above, the dead-end node replies to the request by transmitting a call reject message to the node from which it received the request, (v) each of said nodes, except for said first node, said last node and said dead-end node(s) which receive the request reply to the node or nodes from which the request was received by transmitting either a call accept message or if a call reject message to the node or nodes from which the said request was received, said call accept or call reject message being sent after the node has received the same number of call accept or reject messages as the number of said requests transmitted by the node, the message transmitted by the node being determined from the messages received such that if one or more call accept messages were received than a call accept message is transmitted, or if only call reject message(s) were received then a call reject message is transmitted, (vi) after the first node has received the same number of call accept or reject messages as the number of said requests transmitted by it, the fist node
(a) confirms a virtual network connection between the first and second computer devices if one or more of the messages received was a call accept message, or
(b) abandons the request if none of the messages was a call accept message, (vii) if a virtual network connection is confirmed then the first and last nodes are configured to packetise character data which is transmitted from the first and second computer devices respectively such that each packet of the character data contains a header which includes information which identifies which of said nodes which make up the virtual network connection, as well as a portion of the character data, the first and last nodes are also configured to depacketise packets of character data to be sent to said first and second computer devices respectively.

8. A multi-path local area network system as claimed in claim 7 wherein said program means loaded in the memory includes means for:
including in a call accept message transmitted by one of said nodes, information concerning the loading and relative position of nodes in the partial virtual network connection from the last node to the node transmitting the message is contained in the call accept message, and
if more than one call accept message is received by one of said nodes in response to the requests transmitted by the node, determining routing information for the virtual network connection from the loading information in the received call accept messages.

9. A multi-path local area network system as claimed in claim 8 wherein said program means loaded in the memory includes means for:
if characters of data received from one of said computer devices are separated by more than a predetermined time, packetising the characters without waiting for further characters,
each said node having an input gueue associated with each said input-port of the node, said microprocessor including means for cyclically removing a single packet from the head of each said input gueue, processing the single packet and placing it on a unique output gueue associated with the virtual network connection of the packet, and cyclically removing a single packet from the head of each output queue for transmission.

10. A multi-path local area network system as claimed in claim 9 wherein said program means loaded in the memory includes means for causing each of the input-output ports of each one of said nodes to be configurable to receive character based or packet based data such that when a node receives character input from one of said external devices through an input-output port which was previously configured to receive packet based data that input-output port is reconfigured to receive character based data.

11. A multi-path local area network as claimed in claim 10 wherein said program means loaded in the memory includes means for causing one of said nodes to send out a message when it is powered up or reset requesting the network management program through each of its input-output ports in turn until the node receives a reply from a physically connected other one of said nodes which then downloads the network management program to the node, the microprocessor of the node beginning execution of the network management program and instructing all of said nodes physically connected to it to reconfigure the respective input-output port for packet-based data transmission.

12. A multi-path local area network system as claimed in claim 11 including a source node which contains said network system management program in non-erasable read only memory, said source node in response to a control signal downloading the network management program to any other of said nodes physically connected to it and subsequently to all other of said nodes.

13. A multi-path local area network system as claimed in claim 12 wherein each of said nodes includes means for continually checking its physical connections with other nodes and disabling any connection found to be faulty, later detection of correct operation of a disabled connection causing that connection to be re-enabled.

14. A method for achieving packetised data communications between first and second computer devices connected to respective input/output ports of different intelligent nodes in a multi-path local area network system having a plurality of intelligent nodes with interconnected input/output ports, said method comprising the steps of:
flood-routing, between nodes throughout said system, a call request message from said first device to said second device and thus identifying an available virtual connection path between said first and second devices via a selected subset of said nodes; and
thereafter transmitting packetised data from said first device to said second device via said selected subset of nodes.

15. A method as in claim 14 wherein said transmitting packetised data step comprises packetising and transmitting a data packet sized smaller than the maximum packet size without waiting for further data characters if characters of data received from one of said computer devices are separated by more than a predetermined time.

16. A method as in claim 14 wherein said transmitting packetised data step includes providing an input data queue associated with each node's input/output port and cyclically removing a single packet from the head of each such input queue, processing the single packet and placing it on a unique output queue associated with the virtual connection and cyclically removing a single packet from the head of each said output queue fro transmission over said virtual connection.

17. A method as in claim 16 further comprising:
configuring each of said input/output ports to receive character-based data or packetised data depending upon whether character-based data from one of said devices is being received or packetised data from another node is being received.

18. A method as in claim 14 further comprising:
upon power-up or reset of any of said intelligent nodes, sending a flood-routed request from that node for downloading thereto of a network management computer program from another node in said system, said network management computer program thereafter enabling the powered-up or reset node to carry out said flood-routing of said call request messages and/or to respond to same if received from other nodes.

19. A method as in claim 18 further comprising:
maintaining said network management computer program in non-volatile memory in at least one of said nodes of the system.

20. A method as in claim 14 further comprising:
continually checking the connections of each node with other nodes in the system and disabling any connection found to be faulty, later detection of correct operation of a disabled connection causing that connection to be re-enabled.

21. Apparatus for achieving packetised data communications between first and second computer devices connected to respective input/output ports of different intelligent nodes in a multi-path local area network system having a plurality of intelligent nodes with interconnected input/output ports, said apparatus comprising:
   means for flood-routing, between nodes throughout said system, a call request message from said first device to said second device and thus identifying an available virtual connection path between said first and second devices via a selected subset of said nodes; and
   means for thereafter transmitting packetised data from said first device to said second device via said selected subset of nodes.

22. Apparatus as in claim 21 wherein said means for thereafter transmitting packetised data comprises means for packetising and transmitting a data packet sized smaller than the maximum packet size without waiting for further data characters if characters of data received from one of said computer devices are separated by more than a predetermined time.

23. Apparatus as in claim 21 wherein said means for thereafter transmitting packetised data includes means for providing an input data queue associated with each node's input/output port and cyclically removing a single packet from the head of each such input queue, processing the single packet and placing it on a unique output queue associated with the virtual connection and cyclically removing a single packet from the head of each said output queue for transmission over said virtual connection.

24. Apparatus as in claim 23 further comprising:
   means for configuring each of said input/output ports to receive character-based data or packetised data depending upon whether character-based data from one of said devices is being received or packetised data from another node is being received.

25. Apparatus as in claim 21 further comprising:
   means for sending a flood-routed request upon power-up or reset of any of said intelligent nodes from that node for downloading thereto of a network management computer program from another nodes in said system, said network management computer program including means thereafter enabling the powered-up or reset node to carry out said flood-routing of said call request messages and/or to respond to same if received from other nodes.

26. Apparatus as in claim 25 further comprising:
   means for maintaining said network management computer program in non-volatile memory in at least one of said nodes of the system.

27. Apparatus as in claim 21 further comprising:
   means for continually checking the connections of each node with other nodes in the system and disabling any connection found to be faulty, later detection of correct operation of a disabled connection causing that connection to be re-enabled.

* * * * *